United States Patent
Kamio et al.

(10) Patent No.: US 8,467,111 B2
(45) Date of Patent: Jun. 18, 2013

(54) IMAGE READING APPARATUS, IMAGE FORMING APPARATUS, LIGHT QUANTITY ACQUISITION METHOD AND COMPUTER READABLE MEDIUM

(75) Inventors: Mitsugu Kamio, Ebina (JP); Kosuke Shimizu, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 449 days.

(21) Appl. No.: 12/817,966

(22) Filed: Jun. 17, 2010

(65) Prior Publication Data

US 2011/0013238 A1    Jan. 20, 2011

(30) Foreign Application Priority Data

Jul. 17, 2009   (JP) .................................. 2009-169432

(51) Int. Cl.
*H04N 1/04* (2006.01)
*H04N 1/46* (2006.01)

(52) U.S. Cl.
USPC ............................. 358/475; 358/474; 358/505

(58) Field of Classification Search
None
See application file for complete search history.

(56) References Cited

U.S. PATENT DOCUMENTS 5,864,408 A * 1/1999 Kumashiro ................... 358/461
2002/0054383 A1   5/2002 Sato et al.

FOREIGN PATENT DOCUMENTS

JP        2002-44437 A     2/2002

* cited by examiner

*Primary Examiner* — Thierry Pham
(74) *Attorney, Agent, or Firm* — Sughrue Mion, PLLC

(57) ABSTRACT

An image reading apparatus includes: an image reading unit including a light source and a light receiving unit, and being capable of reading an image of a document sheet with predetermined plural reading conditions; a first light quantity information acquiring unit acquiring first light quantity information on a quantity of light emitted from the light source to a first white reference plate and received by the light receiving unit, for each reading condition; a second light quantity information acquiring unit acquiring second light quantity information on a quantity of light emitted from the light source to a second white reference plate and received by the light receiving unit, for fewer reading conditions than all the plural reading conditions; and a third light quantity information acquiring unit acquiring the second light quantity information for reading conditions other than the fewer reading conditions by using the acquired first light quantity information.

19 Claims, 7 Drawing Sheets

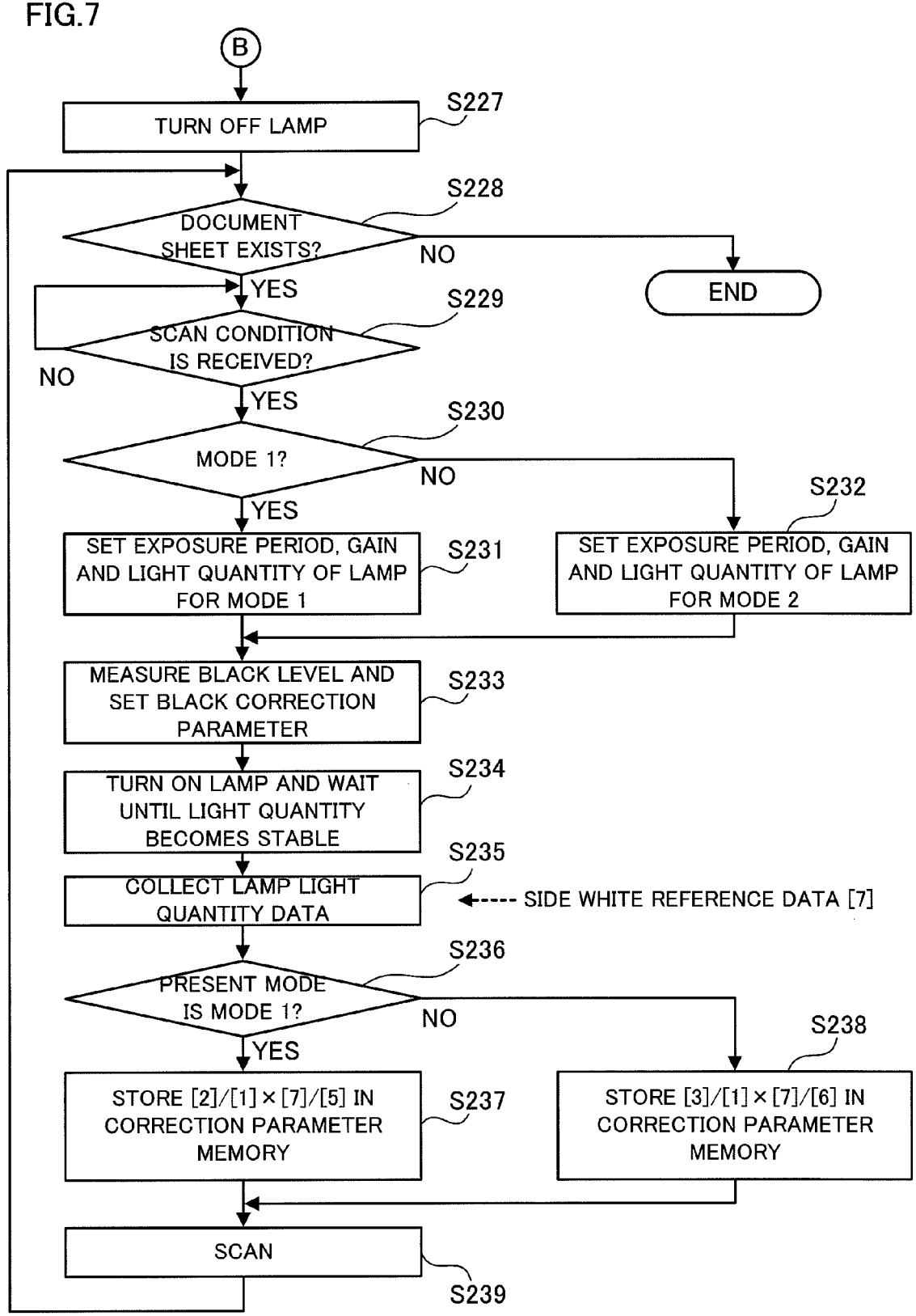

IMAGE READING APPARATUS, IMAGE FORMING APPARATUS, LIGHT QUANTITY ACQUISITION METHOD AND COMPUTER READABLE MEDIUM

CROSS REFERENCE TO RELATED APPLICATIONS

This application is based on and claims priority under 35 USC §119 from Japanese Patent Application No. 2009-169432 filed Jul. 17, 2009.

BACKGROUND

1. Technical Field

The present invention relates to an image reading apparatus, an image forming apparatus, a light quantity acquisition method and a computer readable medium storing a program.

2. Related Art

There is known an image reading apparatus that performs shading correction by acquiring shading data for each scan mode.

SUMMARY

According to an aspect of the present invention, there is provided an image reading apparatus including: an image reading unit that includes a light source and a light receiving unit receiving light, and that is capable of reading an image of a document sheet with plural reading conditions set in advance, the light being emitted from the light source and reflected on the document sheet; a first light quantity information acquiring unit that acquires, as first light quantity information, information on a quantity of light emitted from the light source to a first white reference plate and received by the light receiving unit, for each of the plural reading conditions; a second light quantity information acquiring unit that acquires, as second light quantity information, information on a quantity of light emitted from the light source to a second white reference plate and received by the light receiving unit, for fewer reading conditions than all the plural reading conditions; and a third light quantity information acquiring unit that acquires the second light quantity information for reading conditions other than the fewer reading conditions by using the first light quantity information acquired by the first light quantity information acquiring unit.

BRIEF DESCRIPTION OF THE DRAWINGS

Exemplary embodiment(s) of the present invention will be described in detail based on the following figures, wherein:

FIG. 4 is a flowchart showing an example of processing that the processor performs when the power supply of the apparatus gets turned on; and FIGS. 5 to 7 are flowcharts showing an example of processing that the processor performs when reading an image of a document.

DETAILED DESCRIPTION

Hereinafter, an exemplary embodiment of the present invention will be described in detail with reference to the accompanying drawings.

Figure 1:
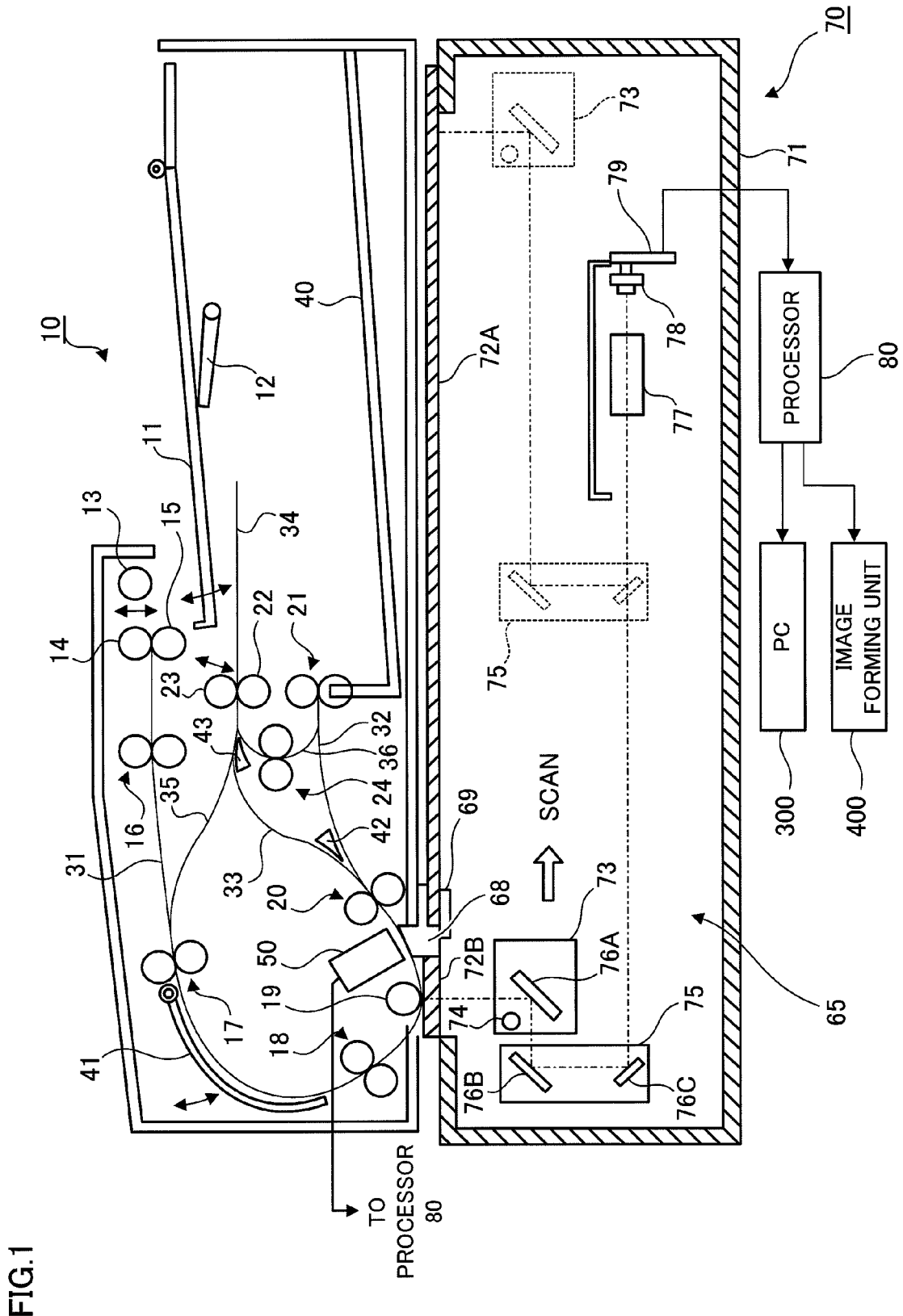
FIG. 1 is a diagram showing an image reading apparatus to which the exemplary embodiment is applied.

FIG. 1 is a diagram showing an image reading apparatus to which the present exemplary embodiment is applied. The image reading apparatus is roughly classified into: a document feeder 10, as an example of a transporting unit, that sequentially transports stacked document sheets to a reading part at which an image reading part 65 (to be described later) performs reading; a scanner 70 that reads images by scanning; and a processor 80 that processes images signals thus read.

The document feeder 10 includes: a document stacking part 11 that stacks thereon a bundle of document sheets composed of plural document sheets; a lifter 12 that raises and lowers the document stacking part 11; a transport roll 13 that transports the document sheets on the document stacking part 11 raised by the lifter 12; a feed roll 14 that transports further downstream the document sheets transported by the transport roll 13; and a retard roll 15 that separates one by one the document sheets fed through the transport roll 13.

A first transport path 31 is a transport path on which document sheets are first transported. Along the first transport path 31, take-away rolls 16, pre-registration rolls 17, registration rolls 18, a platen roll 19, out rolls 20 and a baffle 41 are provided. The take-away rolls 16 transport each of the document sheets thus separated one by one toward rolls on the downstream side thereof. The pre-registration rolls 17 transport the document sheet toward rolls on the downstream side thereof and form a loop of the document sheet. The registration rolls 18 restart rotation in conjunction with the read start timing after a temporary halt to feed the document sheet while performing registration adjustment on a second platen glass 72B to be described later. The platen roll 19 assists transportation of the document sheet being read. The out rolls 20 transport the read document sheet further downstream. The baffle 41 rotates about a pivot in accordance with a state of the loop of the document sheet being transported. Further, a contact image sensor (CIS) 50 is provided between the platen roll 19 and the out rolls 20.

At the downstream side of the out rolls 20, the following are provided, a second transport path 32, a third transport path 33, a transport-path switching gate 42, a document exit portion 40, first exit rolls 21, a fourth transport path 34, an inverter roll 22, an inverter pinch roll 23, a fifth transport path 35, a sixth transport path 36, second exit rolls 24, and an exit switching gate 43. The transport-path switching gate 42 switches the transport path between the second and third transport paths 32 and 33. The document exit portion 40 stacks thereon read document sheets. The first exit rolls 21 output the document sheets toward the document exit portion 40. The fourth transport path 34 is a transport path on which each of the document sheets having passed through the third transport path 33 is switched back. The inverter roll 22 and the inverter pinch roll 23 are provided on the fourth transport path 34 and actually cause the document sheet to switch back. The fifth transport path 35 is used to introduce the document sheet having switched back on the fourth transport path 34 to the first transport path 31, which includes the pre-registration rolls 17 and the like, again. The sixth transport path 36 is used to output the document sheet having switched back on the fourth transport path 34 to the document exit portion 40. The second exit rolls 24 are provided on the sixth transport path 36 and transport the document sheet, which is inverted and to be outputted, toward the first exit rolls 21. The exit switching gate 43 switches the transport path between the fifth and sixth transport paths 35 and 36.

The transport roll 13 is lifted up and held in a retracted position during standby, and is lowered to a nip position (document transport position) during document transportation so as to transport the uppermost document sheet on the document stacking part 11. The transport roll 13 and the feed roll 14 transport the document sheet by the engagement of feed clutches (not shown in the figure). The pre-registration rolls 17 form a loop of the document sheet by causing the leading end of the document sheet to abut against the registration rolls 18 being halted. On the loop formation, the registration rolls 18 move the leading end of the document sheet, having caught into the registration rolls 18, back to the nip position.

Once the above-mentioned loop is formed, the baffle 41 opens about the pivot to function so as not to interfere with the loop formed in the document sheet. The take-away rolls 16 and the pre-registration rolls 17 hold the loop of the document sheet during reading. The loop formation allows adjusting the read timing and suppressing skew which accompanies document transport in reading, thus enhancing the alignment adjustment feature. In conjunction with the read start timing, the registration rolls 18 at rest start rotation and the document sheet is pressed onto the second platen glass 72B (to be described later) by the platen roll 19, so that image data is read from below by use of a CCD image sensor 78 to be described later.

On completion of reading of a one-sided document sheet and on completion of simultaneous duplex reading of a double-sided document sheet, the transport-path switching gate 42 is switched to guide the document sheet having passed through the out rolls 20 to the second transport path 32, and to output the document sheet to the document exit portion 40. In sequential reading of a double-sided document sheet, on the other hand, the transport-path switching gate 42 is switched to guide the document sheet to the third transport path 33 in order to invert the document sheet. In the sequential reading of a double-sided document sheet, the inverter pinch roll 23 is released from a nip state thereof with feed clutches (not shown in the figure) turned off and retracted, and guides the document sheet to the fourth transport path 34. The inverter pinch roll 23 is thereafter placed in the nip state, and guides the document sheet inverted by the inverter roll 22 to the pre-registration rolls 17 as well as transports the document sheet, which is inverted and to be outputted, toward the second exit rolls 24 on the sixth transport path 36.

The scanner 70 supports the document feeder 10 from below. Specifically, the scanner 70 supports the document feeder 10 from below by way of a device frame 71. The scanner 70 includes, in the device frame 71 constituting a housing: a first platen glass 72A on which a document sheet whose image is to be read is placed at rest; and the second platen glass 72B that includes an opening portion for light used to read a document sheet being transported by the document feeder 10. A guiding member 68 that guides the document sheet transported by the document feeder 10 is provided between the first and second platen glasses 72A and 72B. A first white reference plate 69 is disposed below the guiding member 68 to extend in a first scan direction. The first white reference plate 69 has a white surface to be used as a reference in shading correction.

Moreover, the scanner 70 includes the image reading part 65. The image reading part 65, as an example of an image reading unit, includes: a full-rate carriage 73 that stays still (is positioned) under the second platen glass 72B or performs scanning across the entire first platen glass 72A to read an image; and a half-rate carriage 75 that provides light obtained from the full-rate carriage 73 to an image forming part. The full-rate carriage 73 includes: a lamp 74, as an example of a light source, that irradiates a document sheet with light; and a first mirror 76A that receives reflected light obtained from the document sheet. The half-rate carriage 75 includes a second mirror 76B and a third mirror 76C that provide the light obtained from the first mirror 76A to the image forming part. Note that an Xe (xenon) lamp, for example, is used as the lamp 74.

The image reading part 65 also includes: an image forming lens 77 that optically reduces an optical image obtained from the third mirror 76C; the charge coupled device (CCD) image sensor 78 (an example of a light receiving unit) that photo-electrically converts an optical image formed by the image forming lens 77; and a driving substrate 79 on which the CCD image sensor 78 is mounted. An image signal obtained by the CCD image sensor 78 is transmitted to the processor 80 through the driving substrate 79. That is, in the scanner 70, an image is formed on the CCD image sensor 78 by use of a so-called minification optical system.

The image signal transmitted to the processor 80 is subjected to predetermined image processing and then transmitted to a personal computer (PC) 300 or an image forming unit 400 provided below the scanner 70, for example. In the image forming unit 400, for example, an image is formed on a recording medium such as a sheet by the electrophotographic system or the like. Here, the full-rate carriage 73 and the half-rate carriage 75 are moved in a second scan direction by a guide mechanism and a power transmission mechanism formed of a wire, a pulley and the like, which are not shown in the figure. Moreover, the full-rate carriage 73 and the half-rate carriage 75 are moved in the second scan direction by a common carriage motor (not shown in the figure).

When an image on a document sheet placed on the first platen glass 72A is read, the full-rate carriage 73 and the half-rate carriage 75 move in a scan direction (a direction indicated by an arrow in FIG. 1) at a ratio of 2:1. At this time, light from the lamp 74 of the full-rate carriage 73 is emitted to a reading target surface of the document sheet, and reflected light from the document sheet is reflected by the first mirror 76A, the second mirror 76B, and the third mirror 76C in this order and is guided to the image forming lens 77. The light guided to the image forming lens 77 then forms an image on a light receiving face of the CCD image sensor 78. The CCD image sensor 78 is a one-dimensional sensor and processes one line at a time. Thereafter, the full-rate carriage 73 moves in the scan direction (the second scan direction) to read the next line of the document sheet. Document reading over one page is completed by repeating the above process over the entire document sheet.

Meanwhile, the second platen glass 72B is made of a transparent glass plate in the form of a long plate, for example. In the present exemplary embodiment, a document sheet transported by the document feeder 10 passes on the second platen glass 72B. In this event, the full-rate carriage 73 and the half-rate carriage 75 stay still in respective positions indicated by solid lines in FIG. 1. As mentioned in addition, the full-rate carriage 73 is located under the second platen glass 72B.

When an image on a document sheet transported by the document feeder 10 is read, reflected light from the first line of the document sheet having passed through the platen roll 19 of the document feeder 10 forms an image at the image forming lens 77 through the first to third mirrors 76A, 76B, and 76C, and the image is read by the CCD image sensor 78. Specifically, image data corresponding to one line in the first scan direction of the document sheet being transported by the document feeder 10 is concurrently processed by the CCD image sensor 78, which is a one-dimensional sensor. Then, the next line in the first scan direction of the document sheet is read. In the present exemplary embodiment, document reading over one page in the second scan direction is completed when the trailing end of a document sheet passes through a reading position of the second platen glass 72B after the leading end of the document sheet reaches the reading position of the second platen glass 72B.

The scanner 70 will be further described.

Figure 2:
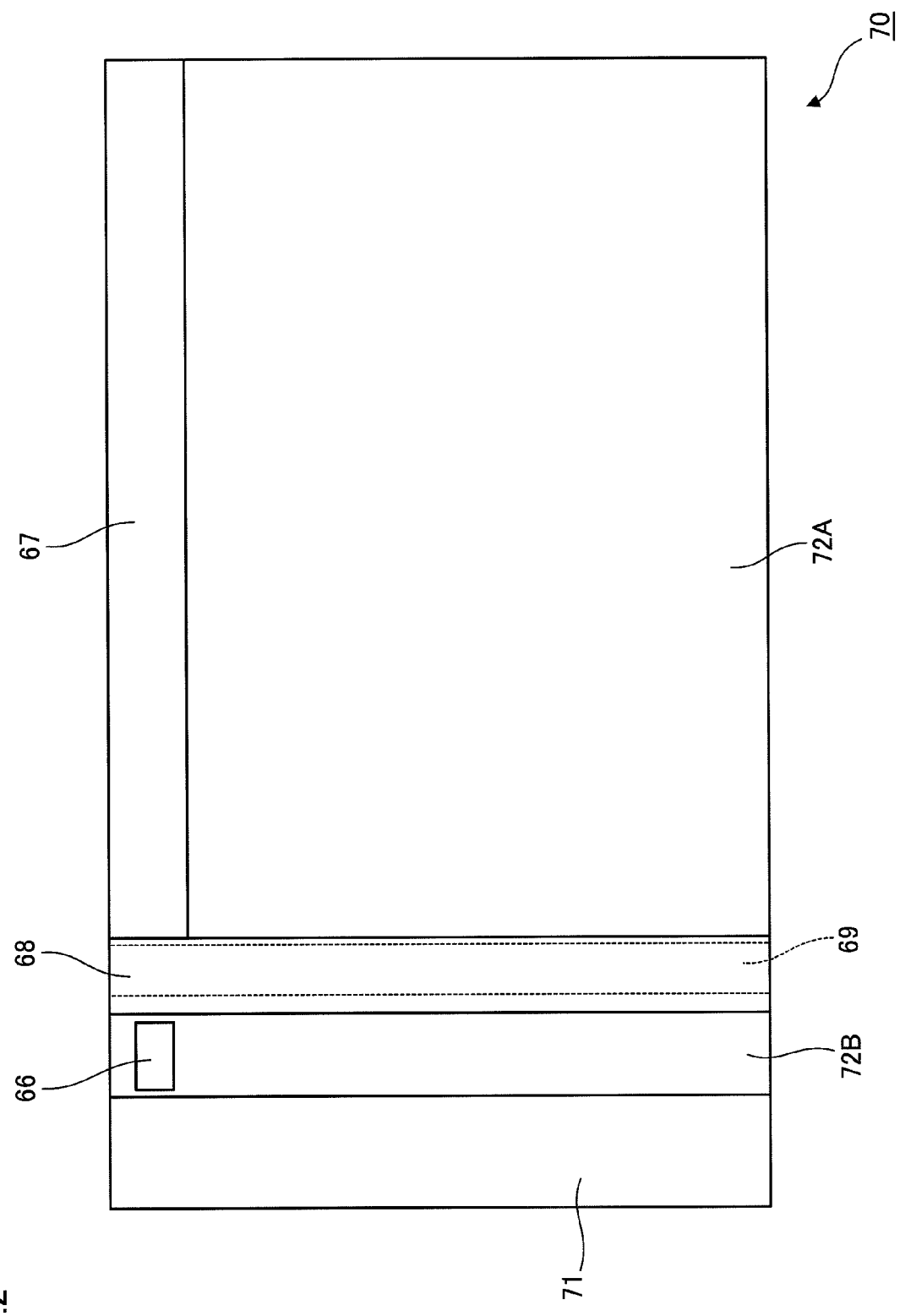
FIG. 2 is a top view of the scanner.

FIG. 2 is a top view of the scanner 70.

As described above, the scanner 70 according to the present exemplary embodiment is provided with the guiding member 68 that guides the document sheet transported by the document feeder 10. The guiding member 68 is provided to extend in the first scan direction, and projects from the top surface of the first platen glass 72A. When a document sheet is set on the first platen glass 72A, one edge of the document sheet is caused to abut against the guiding member 68, and thereby positioning of the document sheet is performed.

In the present exemplary embodiment, the scanner 70 is further provided with a positioning member 67 to extend in the second scan direction. Another edge perpendicular to the above-mentioned one edge is caused to abut against the positioning member 67, and thereby positioning of the document sheet is performed. Additionally, the scanner 70 according to the present exemplary embodiment is provided with a second white reference plate 66 on the bottom surface of the second platen glass 72B. The second white reference plate 66 has a white surface and is located outside of the maximum reading width of a document sheet (at a lateral side of a path on which the document sheet passes). The second white reference plate 66 is provided at a place where the second white reference plate 66 is allowed to be read by the image reading part 65 in which the full-rate carriage 73 is positioned under the second platen glass 72B. The second white reference plate 66 will be hereinafter referred to as side white reference plate 66 in this specification.

Figure 3:
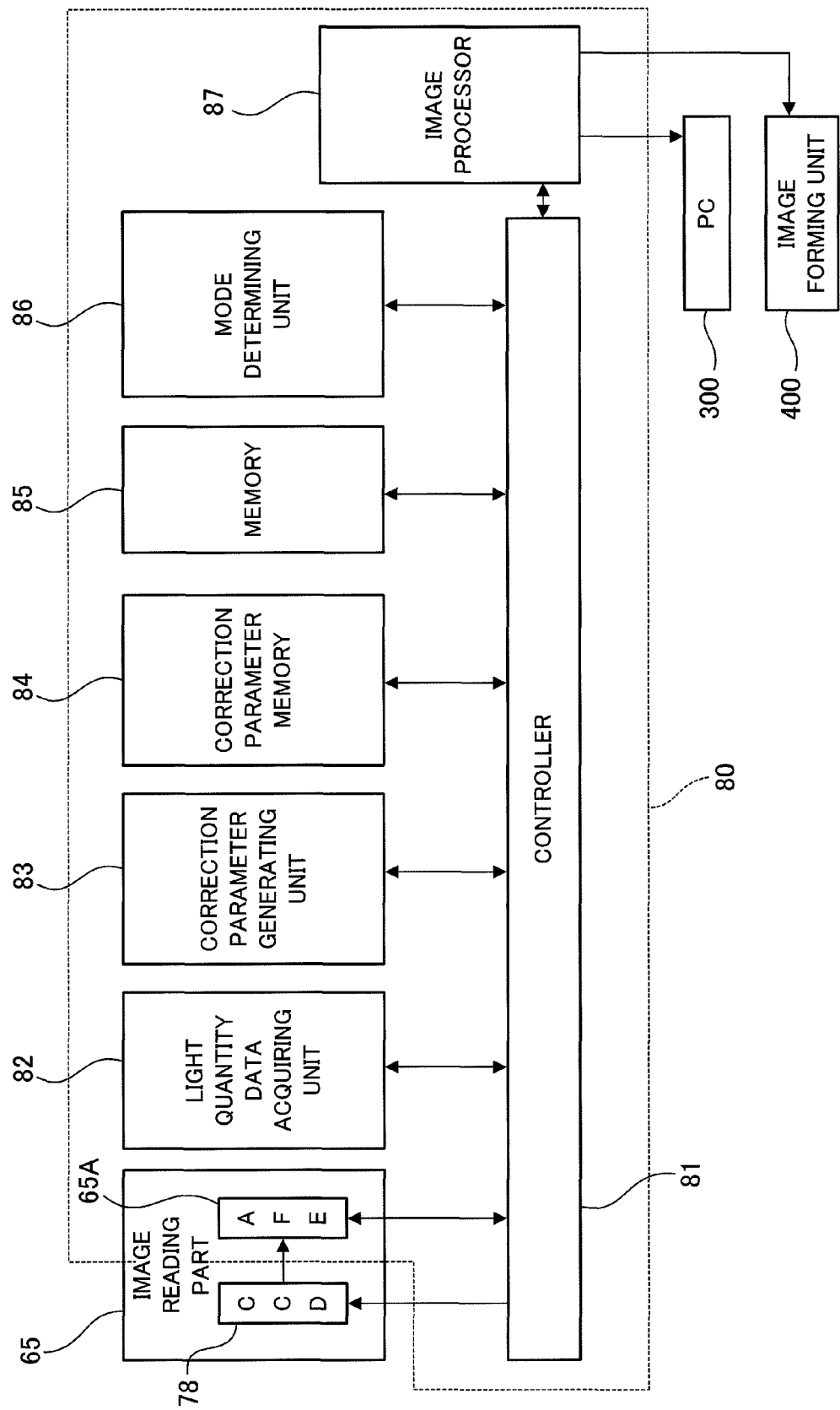
FIG. 3 is a functional block diagram of the processor.

FIG. 3 is a functional block diagram of the processor 80.

The processor 80 according to the present exemplary embodiment includes an analog front end (AFE) 65A that converts an analog signal outputted from the CCD image sensor 78 into a digital signal (digital data). Additionally, the processor 80 includes a controller 81, a light quantity data acquiring unit 82, a correction parameter generating unit 83, a correction parameter memory 84, a memory 85, a mode determining unit 86 and an image processor 87.

The controller 81 includes a central processing unit (CPU), a read only memory (ROM), a random access memory (RAM) and a hard disk drive (HDD) (none of which is shown in FIG. 3), and performs overall control of the processor 80. The CPU executes a processing program for image reading processing whose detail will be described later. The ROM stores various programs, parameters and the like. The RAM is used as a work area and the like when various programs are executed by the CPU.

The processing program for image reading processing may be executed in the following way: the processing program is stored in a recording medium such as a CD-ROM or a DVD-ROM (none of which is shown in FIG. 3) in advance, then installed in the HDD or the like in the controller 81, and read by the CPU. The controller 81 controls each unit and each device provided in the document feeder 10 and the scanner 70. For example, when a document image is being read, the controller 81 sets an exposure period, a gain, a quantity of light emitted from the lamp 74, and the like, and controls the image reading part 65 on the basis of these settings. Additionally, the controller 81 performs gain adjustment (gain control), offset adjustment of a signal level (black level), acquisition of shading data (data for correcting a white level).

The light quantity data acquiring unit 82, which functions as a first light quantity information acquiring unit, a second light quantity information acquiring unit and a pre-transportation acquiring unit, acquires data (light quantity data) on a light quantity of the lamp 74 (quantity of light received by the CCD image sensor 78), on the basis of an image signal obtained by the conversion into digital data. The correction parameter generating unit 83 generates (calculates) a correction parameter used for correcting data such as shading data, on the basis of the light quantity data acquired by the light quantity data acquiring unit 82 when a document image is read and reference data (reference light quantity data) stored in the memory 85. The correction parameter memory 84 stores the correction parameter generated by the correction parameter generating unit 83. The memory 85 stores light quantity data acquired by the light quantity data acquiring unit 82 at a predetermined time or in a case of a predetermined state, as reference data (reference light quantity data) to be used as a reference.

The image processor 87, as an example of a correcting unit, corrects data such as shading data by using a correction parameter stored in the correction parameter memory 84, and corrects image data by using this corrected data.

The mode determining unit 86 determines a mode (reading condition) when an image of a document sheet is read, for each of document sheets. The mode determining unit 86 determines a mode when an image is read, for each of the document sheets, on the basis of information inputted by a user through an unillustrated user interface (UI) and information outputted from a document size detecting sensor provided for the document feeder 10, for example.

A specific example will be described. For example, if plural document sheets having different sizes from each other are stacked in the document feeder 10 and a user gives an instruction to output documents with enlargement or reduction so that all the documents have the same size, the mode determining unit 86 determines, for example, a mode when one size of a document sheet is read as a first mode, and a mode when another size of a document sheet is read as a second mode.

If plural document sheets having different sizes from each other are stacked in the document feeder 10 and a user gives an instruction to output documents with enlargement or reduction so that all the documents have the same size, as described above, a moving speed (for example, a transportation speed of a document sheet) in the second scan direction on the occasion of scanning needs to be changed for each document sheet. Additionally, depending on a required level of quality of an image, the moving speed in the second scan direction on the occasion of scanning needs to be changed for each document sheet. In this case, a reading period of the first scan needs to be changed in accordance with the scan speed. Moreover, along with this change, settings, such as an exposure period and a gain setting value, that influence a light quantity also need to be changed. Accordingly, if there are plural modes for reading, the light quantity data acquiring unit 82 needs to acquire the white reference data (an example of first light quantity information) for each mode, like "white reference data [2] for mode 1" and "white reference data [3] for mode 2," which will be described later.

Next, the flow of processing that the processor 80 performs will be specifically described.

Figure 4:
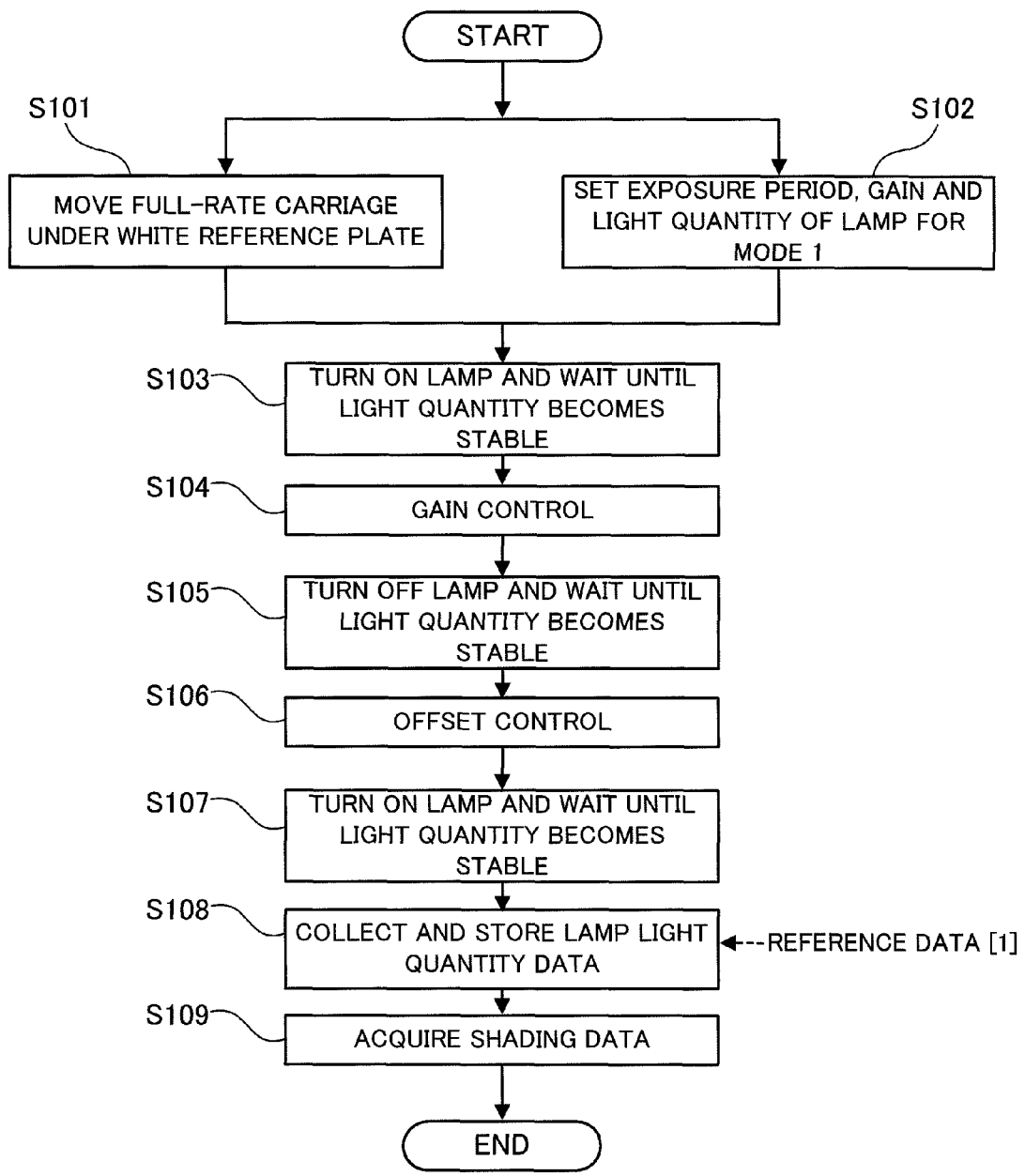

FIG. 4 is a flowchart showing an example of processing that the processor 80 performs when the power supply of the apparatus gets turned on.

First, when the power supply of the apparatus is turned off, the full-rate carriage 73 is stopped in an unillustrated home position. The home position is set at a position in a reading region with a predetermined distance (for example, about 20 mm) from the guiding member 68 so that the size in the first scan direction of a document sheet set on the first platen glass 72A is detected with reading of one line by the CCD image sensor 78.

In such a state, when the power supply of the apparatus gets turned on, a carriage motor (not shown in the figure) is first driven, and thereby the full-rate carriage 73 is moved under the first white reference plate 69 (Step 101). Additionally, when the power supply of the apparatus gets turned on, the exposure period, the gain and the light quantity of the lamp 74 are set to those for a predetermined mode 1 (Step 102).

Next, the controller 81 turns on (lights up) the lamp 74 and waits for a predetermined period until the light quantity becomes stable (Step 103). Thereafter, the gain adjustment (gain control) of a level (white level) of a signal outputted from the CCD image sensor 78 is performed (Step 104). Next, the controller 81 turns off (puts out) the lamp 74 and waits for a predetermined period until the light quantity becomes stable (Step 105). Thereafter, the offset adjustment (offset control) of a level (black level) of a signal outputted from the CCD image sensor 78 is performed (Step 106).

After that, the controller 81 turns on (lights up) the lamp 74 and waits for a predetermined period until the light quantity becomes stable (Step 107). Subsequently, the signal (lamp light quantity data) outputted from the CCD image sensor 78 is collected and stored (Step 108). Note that this lamp light quantity data will be referred to as "reference data [1]" in this specification. Thereafter, shading data used for performing the shading correction is generated (acquired) on the basis of the lamp light quantity data (Step 109).

Figure 5:
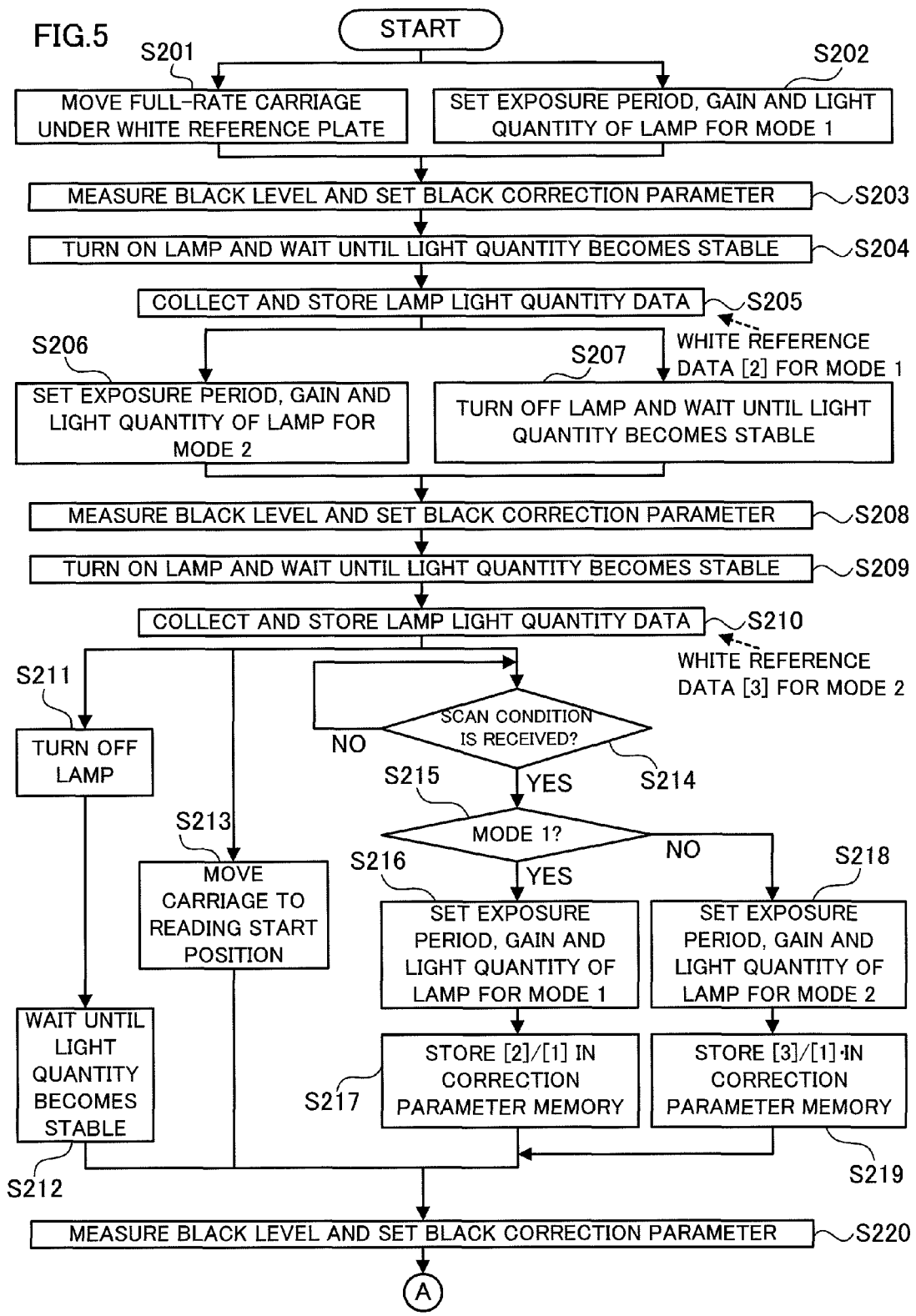
Figure 6:
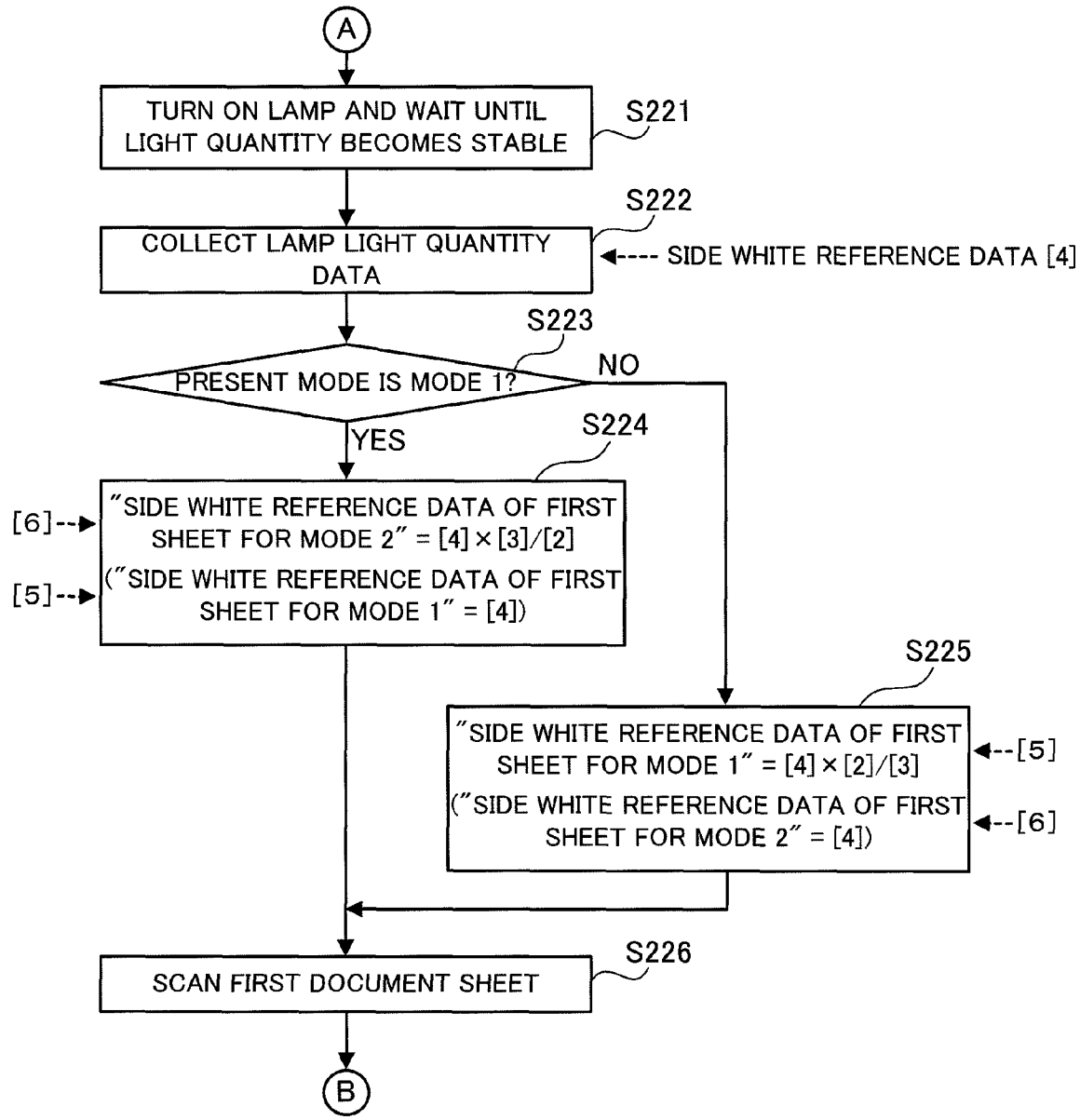

FIGS. 5 to 7 are flowcharts showing an example of processing that the processor 80 performs when reading an image of a document sheet. Note that processing for a case of reading an image of a document sheet transported by the document feeder 10 is shown in the present exemplary embodiment.

When an image of a document sheet is being read, the carriage motor (not shown in the figure) is first driven, and thereby the full-rate carriage 73 is moved under the first white reference plate 69 (Step 201). Additionally, the exposure period, the gain and the light quantity of the lamp 74 are set to those for the predetermined mode 1 (Step 202). Next, a level (black level) of a signal outputted from the CCD image sensor 78 is measured, and the correction parameter used for correcting the black level is generated (set) (Step 203). The controller 81 then turns on (lights up) the lamp 74 and waits for a predetermined period until the light quantity becomes stable (Step 204). Next, the signal (lamp light quantity data) outputted from the CCD image sensor 78 is collected and stored (Step 205). Note that this lamp light quantity data will be referred to as "white reference data [2] for mode 1" in this specification.

Then, the exposure period, the gain and the light quantity of the lamp 74 are set to those for a predetermined mode 2 (Step 206). Additionally, the controller 81 turns off (puts out) the lamp 74 and waits for a predetermined period until the light quantity becomes stable (Step 207). Thereafter, a level (black level) of a signal outputted from the CCD image sensor 78 is measured, and the correction parameter used for correcting the black level is generated (set) (Step 208).

Next, the controller 81 turns on (lights up) the lamp 74 and waits for a predetermined period until the light quantity becomes stable (Step 209). Thereafter, the signal (lamp light quantity data) outputted from the CCD image sensor 78 is collected and stored (Step 210). This lamp light quantity data will be referred to as "white reference data [3] for mode 2" in this specification. In the present exemplary embodiment, a description is given by taking a case where there are two modes, namely the modes 1 and 2, as an example. However, in a case where there are more than two modes, lamp light quantity data for each mode is acquired. As mentioned in addition, the lamp light quantity data for each mode is acquired before a first document sheet is scanned (Step 226), which will be described later.

After that, the controller 81 turns off (puts out) the lamp 74 (Step 211) and waits for a predetermined period until the light quantity becomes stable (Step 212). Additionally, the full-rate carriage 73 is moved to a reading start position (Step 213). Specifically, the full-rate carriage 73 is moved under the second platen glass 72B. Moreover, whether a scan condition is received or not is determined (Step 214). If a scan condition (for example, a document sheet size and whether enlargement/reduction is performed or not) is received, a mode for reading an image (image of the first document sheet) is determined on the basis of the scan condition. Thereafter, whether this mode is the mode 1 or not is determined (Step 215).

If a determination that this mode is the mode 1 is made in Step 215, the exposure period, the gain and the light quantity of the lamp 74 are set to those for the predetermined mode 1 (Step 216). Next, the correction parameter is generated by calculation of "white reference data [2] for mode 1"/"reference data [1]," and stored in the correction parameter memory 84 (Step 217). Note that the image processor 87 multiplies the shading data acquired in the Step 109 mentioned above by this correction parameter (a calculation result), thereby to acquire new shading data. By using this new shading data, the image processor 87 then corrects image data (image data of the first document sheet) acquired by scanning performed in Step 226 to be described later.

Meanwhile, if a determination that this mode is not the mode 1 is made in Step 215 (in a case of the mode 2), the exposure period, the gain and the light quantity of the lamp 74 are set to those for the predetermined mode 2 (Step 218). Next, the correction parameter is generated by calculation of "white reference data [3] for mode 2"/"reference data [1]," and stored in the correction parameter memory 84 (Step 219). Note that the image processor 87 multiplies the shading data acquired in the Step 109 mentioned above by this correction parameter, thereby to acquire new shading data, as in the case of the above. By using this new shading data, the image processor 87 then corrects image data (image data of the first document sheet) acquired by scanning performed in Step 226 to be described later. Thereafter, a level (black level) of a signal outputted from the CCD image sensor 78 is measured, and the correction parameter used for correcting the black level is generated (set) (Step 220).

As shown in FIG. 6, the controller 81 then turns on (lights up) the lamp 74 and waits for a predetermined period until the light quantity becomes stable (Step 221). Next, a signal obtained by reading the side white reference plate 66 (lamp light quantity data (an example of second light quantity information)) among the signals outputted from the CCD image sensor 78 is collected (Step 222). Note that the lamp light quantity data will be referred to as "side white reference data [4]" in this specification. Next, whether the present mode is the mode 1 or not is determined (Step 223).

If a determination that the present mode is the mode 1 is made in Step 223, side white reference data of the first sheet for the mode 2 is acquired by calculation (Step 224). That is, the side white reference data of the first sheet for the mode 2 is acquired not by actual measurement but by calculation. Specifically, the controller 81, which functions as a third light quantity information acquiring unit, performs calculation of <"side white reference data [4]"ב"white reference data [3] for mode 2"/"white reference data [2] for mode 1">, thereby to acquire the side white reference data of the first sheet for the mode 2. As mentioned in addition, the controller 81 multiplies the acquired "side white reference data [4]" by a ratio of the "white reference data [3] for mode 2" to the "white reference data [2] for mode 1," thereby to acquire the side white reference data of the first sheet for the mode 2. Note that side white reference data of the first sheet for the mode 1 remains the above-mentioned "side white reference data [4]."

On the other hand, if a determination that the present mode is not the mode 1 is made in Step 223 (in a case where the present mode is the mode 2), the side white reference data of the first sheet for the mode 1 is acquired by calculation (Step 225). That is, even in this case, the side white reference data of the first sheet for the mode 1 is acquired not by actual measurement but by calculation. Specifically, the controller 81 performs calculation of <"side white reference data [4]"× "white reference data [2] for mode 1"/"white reference data [3] for mode 2">, thereby to acquire the side white reference data of the first sheet for the mode 1. As mentioned in addition, the controller 81 multiplies the acquired "side white reference data [4]" by a ratio of the "white reference data [2] for mode 1" to the "white reference data [3] for mode 2," thereby to acquire the side white reference data of the first sheet for the mode 1, as in the case of the above. Note that the side white reference data of the first sheet for the mode 2 remains the above-mentioned "side white reference data [4]." In the present exemplary embodiment, a description is given by taking a case where there are two modes as an example. However, in a case where there are more than two modes, "side white reference data" for each mode may be acquired by the above-mentioned calculation.

The "side white reference data" is acquired by reading (actually measuring) the side white reference plate 66 prior to image reading. However, in a case where plural modes exist, it is necessary to read (actually measure) the side white reference plate 66 for each of the modes, which takes time. Specifically, when the side white reference plate 66 is read for each of the modes, it is necessary to change the exposure period, the gain, the light quantity of the lamp 74 and the like every time the mode is changed, which takes time. This lengthens a period required for starting the reading of the first document sheet, and reduces the overall productivity. Thus, in the present exemplary embodiment, the "side white reference data" for modes whose number is smaller (one in the above description) than the number of all the modes is acquired, and on the basis of this "side white reference data," the "side white reference data" for the other modes is acquired by calculation, as described above.

Thereafter, in the present exemplary embodiment, the document feeder 10 is caused to operate to scan (read) the first document sheet (Step 226). Note that the shading correction by using the above-mentioned new shading data is performed on the image data acquired this scanning. The "side white reference data of the first sheet for the mode 1" and the "side white reference data of the first sheet for the mode 2" will be hereinafter referred to as "side white reference data of first sheet for mode 1 [5]" and "side white reference data of first sheet for mode 2 [6]," respectively, in this specification.

As shown in FIG. 7, the lamp 74 then gets turned off (put out) (Step 227). Thereafter, a determination is made as to whether or not a document sheet exists on the document stacking part 11, on the basis of output from an unillustrated sensor provided for the document feeder 10 (Step 228). If a determination that a document sheet does not exist is made here, the processing is finished. On the other hand, a determination that a document sheet exists is made in Step 228, a determination is made as to whether a scan condition for the document sheet of which an image is to be read next is received or not (Step 229). If a determination that the scan condition is received is made, a mode for reading the image is determined on the basis of the scan condition.

After that, whether this mode is the mode 1 or not is determined (Step 230). If a determination that this mode is the mode 1 is made, the exposure period, the gain and the light quantity of the lamp 74 are set to those for the predetermined mode 1 (Step 231). Meanwhile, if the determination that this mode is the mode 1 is not made, the exposure period, the gain and the light quantity of the lamp 74 are set to those for the predetermined mode 2 (Step 232).

Thereafter, a level (black level) of a signal outputted from the CCD image sensor 78 is measured, and the correction parameter used for correcting the black level is generated (set) (Step 233). Next, the controller 81 turns on (lights up) the lamp 74 and waits for a predetermined period until the light quantity becomes stable (Step 234). Next, a signal obtained by reading the side white reference plate 66 (lamp light quantity data (an example of pre-transportation light quantity information)) among the signals outputted from the CCD image sensor 78 is collected (Step 235). Note that this lamp light quantity data will be referred to as "side white reference data [7]" in this specification.

Next, whether the present mode is the mode 1 or not is determined (Step 236). If a determination that the present mode is the mode 1 is made, a new correction parameter for the shading data acquired in Step 109 mentioned above is generated, and stored in the correction parameter memory 84 (Step 237). Specifically, calculation of <"white reference data [2] for mode 1"/"reference data [1]"ב"side white reference data [7]"/"side white reference data of first sheet for mode 1 [5]"> is performed, and the result of this calculation is stored in the correction parameter memory 84 as a correction parameter.

In other words, the correction parameter acquired by the calculation of <"white reference data [2] for mode 1"/"reference data [1]"> performed in Step 217 mentioned above is multiplied by a ratio of the "side white reference data [7]" (the present side reference data for the mode 1) to the "side white reference data of first sheet for mode 1 [5]" (the previous side reference data for the mode 1), and thereby the new correction parameter is generated. The acquired correction parameter is then stored as a new correction parameter. Although in the present exemplary embodiment, the correction parameter is stored in the correction parameter memory 84, intermediate data for calculating the correction parameter may be stored in the correction parameter memory 84.

After that, the document feeder 10 is caused to operate to scan a document sheet (a second document sheet) (Step 239). Additionally, the image processor 87 multiplies the shading data acquired in Step 109 mentioned above by the correction parameter stored in Step 237 mentioned above, thereby to acquire new shading data. By using this new shading data, the image processor 87 then performs the shading correction on image data (image data of the second document sheet) acquired by scanning performed in Step 239.

On the other hand, even when a determination that the present mode is not the mode 1 is made in Step 236 (in the case of the mode 2), a new correction parameter for the shading data acquired in Step 109 mentioned above is generated, and stored in the correction parameter memory 84 (Step 238). Specifically, calculation of <"white reference data [3] for mode 2"/"reference data [1]"ב"side white reference data

[7]"/"side white reference data of first sheet for mode 2 [6]"> is performed, and the result of this calculation is stored in the correction parameter memory 84 as a correction parameter.

After that, as described above, the document feeder 10 is caused to operate to scan a document sheet (the second document sheet) (Step 239). Additionally, the image processor 87 multiplies the shading data acquired in Step 109 mentioned above by the correction parameter stored in Step 238 mentioned above, thereby to acquire new shading data. By using this new shading data, the image processor 87 then performs the shading correction on image data (image data of the second document sheet) acquired by scanning performed in Step 239.

Thereafter, the processing in Step 228 is performed again. Specifically, a determination is made as to whether or not a document sheet exists on the document stacking part 11. If a determination that a document sheet does not exist is made here, the processing is finished. On the other hand, a determination that a document sheet exists is made, the processing in Step 229 and the subsequent steps is performed again. Thereby, new "side white reference data [7]" is acquired in Step 235. As mentioned in addition, "side white reference data [7]" immediately before a third document sheet is read is acquired. Thereafter, the above-mentioned calculation is performed by using this new "side white reference data [7]" in Step 237 or 238. The result of this calculation is stored in the correction parameter memory 84 as a new correction parameter.

In the present exemplary embodiment, if there are plural modes for reading, the white reference data (an example of first light quantity information) is acquired for each mode and by actual measurement. Specifically, the white reference data for all the modes (modes 1 and 2) is acquired by actual measurement, as described in Steps 205 and 210 (see FIG. 5) mentioned above.

However, the white reference data may be acquired by calculation. For example, when there are plural modes, for one mode, the white reference data is acquired by actual measurement. Additionally, ratios (light quantity ratios) of the white reference data for this one mode to that for each of the other modes are stored in advance in the memory 85 (see FIG. 3). The white reference data for the other modes is then acquired by using the white reference data acquired for the one mode and the ratios stored in the memory 85.

In the present exemplary embodiment, a part of the side white reference data is also acquired by actual measurement, while the other side white reference data is acquired by calculation. A mode for which the side white reference data is acquired by actual measurement may be different from a mode for which the white reference data is acquired by actual measurement. For example, even if the mode for which the white reference data is acquired by actual measurement is the mode 1, the side white reference data (side white reference data obtained by actual measurement) may be acquired for the mode 2.

A specific example for a case in which the white reference data is acquired by calculation (by using the ratios) will be described here.

In this specific example, a case in which there are six modes of modes 1 to 6 is assumed. In such a case, for example, assume that the light quantity ratios for the modes 1 to 3 are 1, 1.08 and 1.15, respectively, and that these light quantity ratios are stored in the memory 85. Additionally, assume that the light quantity ratios for the modes 4 to 6 are 1, 1.08 and 1.20, respectively, and that these light quantity ratios are stored in the memory 85.

Then, similarly to the processing shown in Step 205 mentioned above, the white reference data for the modes 1 and 4, for example, is acquired (acquired by actual measurement). Thereafter, calculation is performed by using the above-mentioned light quantity ratios stored in the memory 85, and thereby the white reference data for the modes 2, 3, 5 and 6 is acquired. Note that specific calculation formulae for acquiring the white reference data are as follows.

"white reference data for mode 2"="white reference data for mode 1"×1.08

"white reference data for mode 3"="white reference data for mode 1"×1.15

"white reference data for mode 5"="white reference data for mode 4"×1.08

"white reference data for mode 6"="white reference data for mode 4"×1.20

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
   an image reading unit that includes a light source and a light receiving unit receiving light, and that reads an image of a document sheet having a plurality of image reading conditions set in advance, the light being emitted from the light source and reflected on the document sheet;
   a first light quantity information acquiring unit that acquires, as a plurality of pieces of first light quantity information a plurality of pieces of information on a quantity of light emitted from the light source to a first white reference plate and received by the light receiving unit for each one of the plurality of reading conditions respectively;
   a second light quantity information acquiring unit that acquires, as second light quantity information for at least one fewer reading condition than a total number of the plurality of reading conditions, information on a quantity of light emitted from the light source to a second white reference plate and received by the light receiving unit;
   a third light quantity information acquiring unit that acquires the second light quantity information for a reading condition other than the at least one fewer reading condition, by using the plurality of pieces of first light quantity information acquired by the first light quantity information acquiring unit; and
   a controller that controls reading the image of the document sheet differently for each one of the plurality of reading conditions respectively,
   wherein the first light quantity information acquiring unit exposes the first white reference plate for each one of the plurality of reading conditions respectively.

2. The image reading apparatus according to claim 1, wherein the third light quantity information acquiring unit acquires the second light quantity information for a reading condition other than the at least one fewer reading condition, by using a ratio between the plurality of pieces of first light quantity information acquired by the first light quantity information acquiring unit and using the second light quantity information acquired by the second light quantity information acquiring unit.

3. The image reading apparatus according to claim 1, further comprising a transporting unit that sequentially transports a document sheet from stacked document sheets to a reading part formed by the image reading unit, wherein
the first light quantity information acquiring unit acquires the plurality of pieces of first light quantity information before a first document sheet among the stacked document sheets is transported by the transporting unit.

4. The image reading apparatus according to claim 3, further comprising a correcting unit that corrects shading data based on a piece of the first light quantity information corresponding to a reading condition for the first document sheet, and corrects image data of the first document sheet by using the shading data having been corrected, the image data being acquired by the image reading unit.

5. The image reading apparatus according to claim 4, further comprising: a pre-transportation acquiring unit that acquires pre-transportation light quantity information on a quantity of the light emitted from the light source to the second white reference plate and received by the light receiving unit after the first document sheet is transported by the transporting unit and before a second document sheet is transported by the transporting unit, wherein
the correcting unit corrects the shading data based on the pre-transportation light quantity information acquired by the pre-transportation acquiring unit and the second light quantity information acquired by any one of the second light quantity information acquiring unit and the third light quantity information acquiring unit, and corrects image data of the second document sheet by using the shading data having been corrected, the image data being acquired by the image reading unit, the second light quantity information corresponding to a reading condition when the pre-transportation light quantity information is acquired.

6. The image reading apparatus according to claim 1, further comprising a transporting unit that sequentially transports a document sheet from stacked document sheets to a reading part formed by the image reading unit, wherein
the image reading unit is positioned in a position set in advance when reading an image of the document sheet transported by the transporting unit, and
the second white reference plate is provided in such a position that the image reading unit having been positioned is capable of reading the second white reference plate.

7. The image reading apparatus according to claim 1, wherein at least one of an exposure period, a gain, and a quantity of light emitted from the lamp is different for the plurality of reading conditions, and
wherein the first light quantity information acquiring unit acquires the light quantity information for each one of the plurality of reading conditions respectively, with the at least one of the exposure period, the gain, and the quantity of light emitted from the lamp being different.

8. An image reading apparatus comprising:
an image reading unit that includes a light source and a light receiving unit receiving light, and that reads an image of a document sheet having a plurality of image reading conditions set in advance, the light being emitted from the light source and reflected on the document sheet;
a first light quantity information acquiring unit that acquires, as a plurality of pieces of first light quantity information a plurality of pieces of information on a quantity of light emitted from the light source to a first white reference plate and received by the light receiving unit for each one of the plurality of reading conditions respectively;
a second light quantity information acquiring unit that acquires, as second light quantity information for at least one fewer reading condition than a total number of the plurality of reading conditions, information on a quantity of light emitted from the light source to a second white reference plate and received by the light receiving unit; and
a third light quantity information acquiring unit that acquires the second light quantity information for a reading condition other than the at least one fewer reading condition, by using the plurality of pieces of first light quantity information acquired by the first light quantity information acquiring unit,
wherein the first light quantity information acquiring unit exposes the first white reference plate for each one of the plurality of reading conditions respectively, and
a length of a first scan direction of the first white reference plate is different from a length of the first scan direction of the second white reference plate.

9. The image reading apparatus according to claim 8, wherein the third light quantity information acquiring unit acquires the second light quantity information for a reading condition other than the at least one fewer reading condition, by using a ratio between the plurality of pieces of first light quantity information acquired by the first light quantity information acquiring unit and using the second light quantity information acquired by the second light quantity information acquiring unit.

10. The image reading apparatus according to claim 8, further comprising a transporting unit that sequentially transports a document sheet from stacked document sheets to a reading part formed by the image reading unit, wherein
the first light quantity information acquiring unit acquires the plurality of pieces of first light quantity information before a first document sheet among the stacked document sheets is transported by the transporting unit.

11. The image reading apparatus according to claim 10, further comprising a correcting unit that corrects shading data based on a piece of the first light quantity information corresponding to a reading condition for the first document sheet, and corrects image data of the first document sheet by using the shading data having been corrected, the image data being acquired by the image reading unit.

12. The image reading apparatus according to claim 11, further comprising: a pre-transportation acquiring unit that acquires pre-transportation light quantity information on a quantity of the light emitted from the light source to the second white reference plate and received by the light receiving unit after the first document sheet is transported by the transporting unit and before a second document sheet is transported by the transporting unit, wherein
the correcting unit corrects the shading data based on the pre-transportation light quantity information acquired by the pre-transportation acquiring unit and the second light quantity information acquired by any one of the second light quantity information acquiring unit and the third light quantity information acquiring unit, and corrects image data of the second document sheet by using the shading data having been corrected, the image data being acquired by the image reading unit, the second light quantity information corresponding to a reading condition when the pre-transportation light quantity information is acquired.

13. The image reading apparatus according to claim 8, further comprising a transporting unit that sequentially transports a document sheet from stacked document sheets to a reading part formed by the image reading unit, wherein
the image reading unit is positioned in a position set in advance when reading an image of the document sheet transported by the transporting unit, and
the second white reference plate is provided in such a position that the image reading unit having been positioned is capable of reading the second white reference plate.

14. An image reading apparatus comprising:
an image reading unit that includes a light source and a light receiving unit receiving light, and that reads an image of a document sheet having a plurality of image reading conditions set in advance, the light being emitted from the light source and reflected on the document sheet;
a first light quantity information acquiring unit that acquires, as a plurality of pieces of first light quantity information a plurality of pieces of information on a quantity of light emitted from the light source to a first white reference plate and received by the light receiving unit for each one of the plurality of reading conditions respectively;
a second light quantity information acquiring unit that acquires, as second light quantity information for at least one fewer reading condition than a total number of the plurality of reading conditions, information on a quantity of light emitted from the light source to a second white reference plate and received by the light receiving unit; and
a third light quantity information acquiring unit that acquires the second light quantity information for a reading condition other than the at least one fewer reading condition, by using the plurality of pieces of first light quantity information acquired by the first light quantity information acquiring unit,
wherein the first light quantity information acquiring unit exposes the first white reference plate for each one of the plurality of reading conditions respectively before a first page of a document sheet is transported.

15. The image reading apparatus according to claim 14, wherein the third light quantity information acquiring unit acquires the second light quantity information for a reading condition other than the at least one fewer reading condition, by using a ratio between the plurality of pieces of first light quantity information acquired by the first light quantity information acquiring unit and using the second light quantity information acquired by the second light quantity information acquiring unit.

16. The image reading apparatus according to claim 14, further comprising a transporting unit that sequentially transports a document sheet from stacked document sheets to a reading part formed by the image reading unit, wherein
the first light quantity information acquiring unit acquires the plurality of pieces of first light quantity information before a first document sheet among the stacked document sheets is transported by the transporting unit.

17. The image reading apparatus according to claim 16, further comprising a correcting unit that corrects shading data based on a piece of the first light quantity information corresponding to a reading condition for the first document sheet, and corrects image data of the first document sheet by using the shading data having been corrected, the image data being acquired by the image reading unit.

18. The image reading apparatus according to claim 17, further comprising: a pre-transportation acquiring unit that acquires pre-transportation light quantity information on a quantity of the light emitted from the light source to the second white reference plate and received by the light receiving unit after the first document sheet is transported by the transporting unit and before a second document sheet is transported by the transporting unit, wherein
the correcting unit corrects the shading data based on the pre-transportation light quantity information acquired by the pre-transportation acquiring unit and the second light quantity information acquired by any one of the second light quantity information acquiring unit and the third light quantity information acquiring unit, and corrects image data of the second document sheet by using the shading data having been corrected, the image data being acquired by the image reading unit, the second light quantity information corresponding to a reading condition when the pre-transportation light quantity information is acquired.

19. The image reading apparatus according to claim 14, further comprising a transporting unit that sequentially transports a document sheet from stacked document sheets to a reading part formed by the image reading unit, wherein
the image reading unit is positioned in a position set in advance when reading an image of the document sheet transported by the transporting unit, and
the second white reference plate is provided in such a position that the image reading unit having been positioned is capable of reading the second white reference plate.

* * * * *